Sept. 17, 1935.   W. D. BUCKINGHAM ET AL   2,014,926
OVEN HEAT CYCLE REGULATOR

Filed May 28, 1932

*INVENTOR*
J. Z. MILLAR
W. D. BUCKINGHAM

*ATTORNEY*

Patented Sept. 17, 1935

2,014,926

UNITED STATES PATENT OFFICE 2,014,926

OVEN HEAT CYCLE REGULATOR

William D. Buckingham and Julian Z. Millar, Southampton, N. Y., assignors to The Western Union Telegraph Company, New York, N. Y., a corporation of New York Application May 28, 1932, Serial No. 614,200

6 Claims. (Cl. 219—20)

This invention relates to electrically heated ovens or similar structures and particularly to means to automatically regulate the amount of heat transmitted to said structure.

The principal object of this invention is to regulate the amount of heat supplied to an oven or similar structure so as to maintain very accurately a substantially uniform mean temperature internally of the oven under conditions of varying temperature externally thereof.

Another object of this invention is to regulate the amount of heat supplied to an electrically heated structure by automatically controlling the current so that under varying external conditions, the heat added to the structure during closed circuit periods will substantially equal that lost by the structure during open circuit periods, whereby the periods of open and closed circuit conditions will be substantially equal.

A further object is to provide means controlled by the condition of the heater circuit for automatically regulating said heat by controlling the amount of current traversing the heater circuit.

It is well known that for certain uses of ovens, such as, for example, maintaining a tuning fork at an even mean temperature to eliminate frequency variations due to temperature changes, it is extremely essential that a uniformly even mean temperature be constantly maintained irrespective of changes in the external temperature conditions. Theoretically, an even mean temperature will be maintained in an oven or other enclosure heated by periodically supplying and withholding the heat, when the relation between the time required to add heat to the structure during heat supplying periods and the time required for the temperature to drop to the point where heat is again supplied, remains constant. However, this condition obtains only when the mean rate of heat radiation from the oven remains substantially constant. In other words, when the temperature externally of the oven does not change.

In practice, however, the conditions for maintaining substantially even temperature in an oven or enclosed structure does not hold when the temperature externally of the oven rises and falls in any appreciable degree. The problem of maintaining a substantially even temperature externally of the oven requires an additional heating unit and control means therefor. According to this invention, however, means is provided for regulating the amount of heat supplied to the oven during heat supplying periods so as to maintain the same relation under all conditions within a certain limit between the periods during which the heat is supplied and withheld. In other words, under ideal conditions the periods during which heat is supplied are substantially equal to those during which the heat is withheld. The means according to this invention is provided for maintaining this relation of equal periods under varying external temperature conditions of the oven.

For a further description of this invention refer to the accompanying drawing in which.

Figure 1:
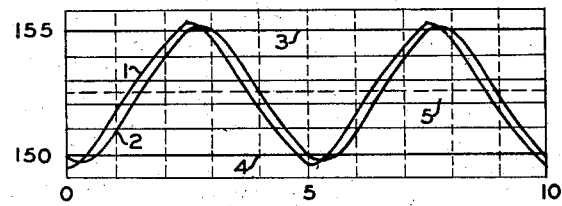
Fig. 1 is a graph illustrating the oven atmosphere and the thermostat under ideal oven operating conditions.

Referring to the figures illustrating the conditions obtaining during different heat cycles, curve 1 in Fig. 1 represents the rise and fall of the heat supplying medium in the oven which is ordinarily the heating element and the surrounding atmosphere which conducts the heat from the element to the articles within the oven. It will be assumed that the thermostat is at the same temperature as the articles in the oven such as would obtain when the thermostat was fastened to the articles or placed thereon. Curve 2 represents the rise and fall of the temperature of the thermostat. In the graph temperature is represented along the ordinates and time along the abscissa. The upper and lower lines 3 and 4 represent the temperature limits of the thermostat between opening and closing conditions. The line 4 represents the point or the temperature at which the thermostat will close and line 3 the temperature at which the thermostat will open. Assuming that the range of the thermostat is 5 degrees and that the thermostat closed at 150 degrees represented by line 4, it will open at 155 degrees represented by line 3. Under the conditions illustrated in Fig. 1 the open and closed circuit periods of the heater circuit are equal. Assuming that the heated circuit is closed the temperature of the oven atmosphere will rise as illustrated in the rising portion of curve 1. The articles in the oven and the thermostat will also rise but will lag behind the rise of the oven atmosphere as illustrated by curve 2. It is clearly understood that this lag is due to the fact that in order for heat transfer to take place between two objects there must be a temperature difference between the same. The greater the heat absorbing power of the articles in the particular oven, the greater the temperature lag or the longer the time between the instant when the oven atmosphere is at a specific temperature and when the heated articles reach the same temperature. Assuming that the units of time along the abscissa are minutes, during a closed circuit condition, the instant when the thermostat reaches let us say 153 degrees will be approximately one-quarter of a minute after the instant at which the oven atmosphere reached that temperature. It must be remembered that in its operation the thermostat will open the heater circuit only after the thermostat itself has reached the circuit opening temperature, 155 degrees under the conditions of the illustration. At this time the oven temperature will have been raised to a point beyond the temperature of the thermostat, about one-half a degree as shown in the graph. When the circuit is open the oven atmosphere will begin to cool off and its temperature recede. However, as long as the oven atmosphere temperature is above that of the thermostat or articles in the oven their temperature will continue to rise. At such time as their temperatures are the same the temperature of the articles is substantially at a standstill. As the temperature of the oven atmosphere continues to recede, due to the heat radiated from the oven to the cooler external atmosphere, the temperature of the articles recedes also but lags behind the oven temperature substantially the same amount as during the closed circuit conditions, causing the atmosphere to fall below the thermostat lower limit. This rise and fall of the temperatures continues throughout each cycle. It will be observed that the curve 2 illustrating the heat of the articles rises and falls substantially uniformly and an equal amount above and below the point of thermostat response. Under these conditions the average or mean temperature of the oven will be substantially the temperature midway between the points of thermostatic response or 152½ degrees.

Figure 2:
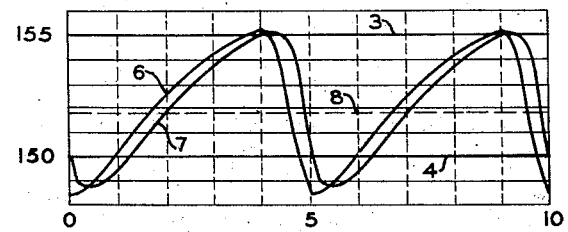
Fig. 2 is another graph illustrating the conditions obtaining when the heating period is considerably prolonged and the cooling period correspondingly shortened.

The graph shown in Fig. 2 illustrates a condition in which the closed circuit period is considerably extended and the open circuit period correspondingly shortened. Although the time for a complete cycle may change, a complete cycle is illustrated as occurring in the same five minute period as in Fig. 1. The graph shows the circuit closed for four of the five minute period and open for only one minute of the period. The curve 6 indicates the temperature condition of the oven atmosphere, while curve 7 illustrates the temperature condition of the thermostat and the article being treated. The lag between the change in temperature of the thermostat and the oven atmosphere is taken to be substantially the same as when the heat cycle is divided into equal periods. This leg, however, might be greater or less, according to the specific heat of the various bodies being affected. The curve illustrates that the difference of temperature and the article at any one instant during the closed circuit period is somewhat less than in Fig. 1 and, therefore, the temperature of the atmosphere does not exceed the temperature of the thermostat at cut-off condition to the same extent, the atmosphere would be at about 155¼ degrees at the time the thermostat opened the circuit. The slow addition of the heat to the oven is caused by a relatively greater radiation due to a lower external temperature about the oven than the condition described for Fig. 1. Therefore, as soon as the heater circuit is open the oven begins to cool off very rapidly and the downward movement of the temperatures is illustrated by relatively steep curves. Under such conditions the temperature difference between the atmosphere and the article is greater at any one instant than during the rising portion of the curve. Therefore, at the time when the thermostat reaches the lower limit or circuit closing condition, the temperature of the atmosphere will have dropped considerably below this temperature or about 1½ degrees below, as indicated. Before the internal atmospheric temperature is raised appreciably the temperature of the thermostat and article will have fallen considerably below the lower thermostatic limit, or about 1¼ degrees in the illustration. These temperature changes are repeated for each succeeding cycle of open and closed circuit conditions. Under these conditions the mean temperature will not be at the midpoint between the operating limits of the thermostat but will be some point below that temperature. This temperature mean is indicated by the dotted line 8, which is slightly below 152 degrees. A comparison of this mean temperature line with the line 5 of Fig. 1 will show that under lower external temperature conditions a heater circuit controlled by a thermostat alone does not maintain the same mean temperature, but on the other hand the mean temperature has become lowered.

Figure 3:
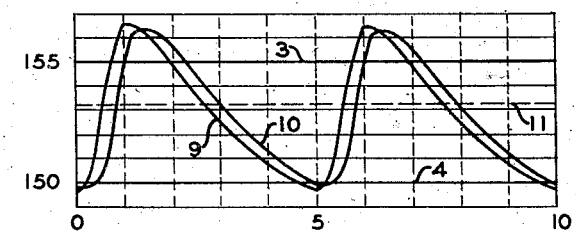
Fig. 3 is a further graph illustrating the conditions when the heating period is considerably shortened and the cooling period prolonged.

In Fig. 3 a graph of the opposite condition of Fig. 2 is illustrated with the external temperature conditions of the oven above normal. Therefore, with the heater circuit closed, the temperature of the oven as indicated by curve 9 rises very rapidly, but when the circuit is opened the temperature drops off slowly. Curve 10 represents the temperature of the thermostat. The conditions are such that the circuit is closed one minute out of the five minute period and open four minutes of the five minute period. Under these conditions the temperature of the oven atmosphere exceeds the temperature of the thermostat by 1½ degrees when the thermostat opens the circuit. On the other hand, as the oven cools off, the temperature of the oven atmosphere lowers in excess of the thermostat to approximate one-quarter of a degree. In other words the temperature curves are inverted and the mean temperature of the curve 10 is above instead of below the mean temperature of the thermostatic operating limits, by an amount of more than one-half a degree in the illustration.

These graphs clearly show that in a circuit controlled by a simple thermostat with a uniform amount of current traversing the circuit during closed circuit periods such a thing as maintaining the same mean temperature under varying external oven conditions does not obtain.

Figure 4:
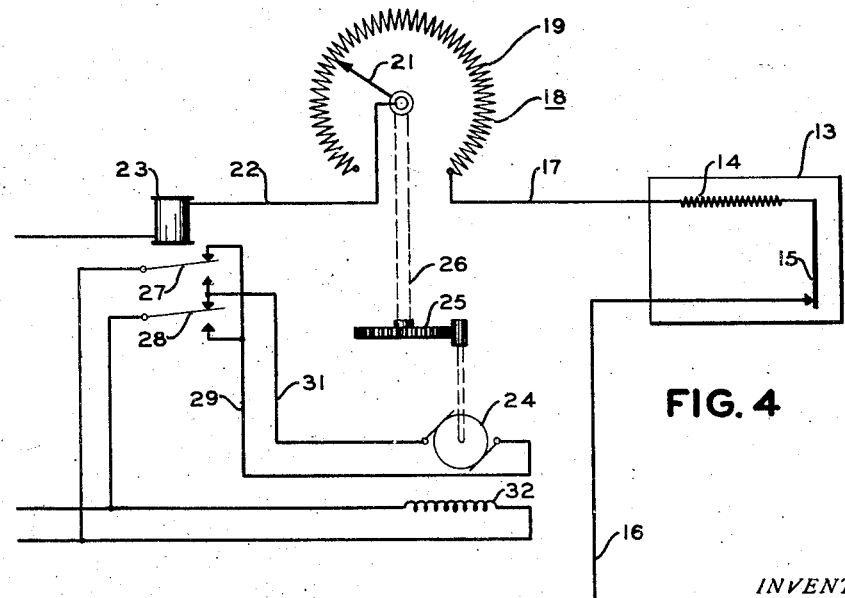
Fig. 4 is a circuit diagram of the preferred embodiment of the invention showing an electrically heated oven and means to automatically regulate the current traversing the heater circuit.

Referring now to Fig. 4, the embodiment of this invention is illustrated diagrammatically in its preferred form. According to this arrangement the amount of current traversing the heater circuit is regulated so that during external oven conditions of relatively low temperature, a greater amount of heat than normal is added to the oven during circuit closed periods. Likewise during relatively high external temperature conditions a lesser amount of heat than normal is added to the oven. This heat is regulated automatically as will presently be explained.

The arrangement comprises an oven 13, with the heating unit 14 disposed therein, and a thermostat 15 for opening and closing the circuit in response to changes in temperature of the oven. The heater unit and thermostat are in series in the heater circuit, which includes conductors 16 on one side and 17 on the other. In series also in the heater circuit is a rheostat regulator 18, comprising a resistance 19 and a movable arm 21. Any form of current regulator may be employed in this connection. The moving arm of the thermostat is connected through conductor 22 to a relay 23 in series with the heater circuit.

This relay controls a reversible motor 24 joined through a reduction gear 25 and the shaft 26 to the arm 21. The rotation of the motor is preferably arranged to move the arm very slowly along the resistance contacts in the rheostat. This may be accomplished by a compound reduction gear or other suitable means of speed reduction. As will be appreciated the movement of the arm 21 changes the amount of resistance in the heater circuit so as to vary the amount of current traversing the circuit. The motor 24 may be any suitable type of reversible motor. As illustrated the motor has a fixed field 32 with means for reversing the current through the armature. The current is fed to the armature of the motor through the tongues 27 and 28 of the relay 23. These tongues are arranged so that on their front contact they are connected through conductors 29 and 31 across the armature of the motor in one direction and when on their back contacts are connected across the armature of the motor in the other direction.

In operation the closing of the heater circuit by the thermostat 15 will cause the relay 23 to be energized and the tongues pulled up to their front contact, energizing the motor 25 in such a direction as to cause it to rotate the arm 21 in a clockwise direction. As long as the heater circuit remains closed the arm 21 continues to move very slowly in this direction. When the oven temperature has risen sufficiently to cause the thermostat to open the heater circuit, the relay 23 is de-energized and the contacts 28 and 29 drop to their back contacts, reversing the direction of the motor 24. This causes the arm 21 to move in a reverse direction to add more resistance to the heater circuit. If the conditions external of the oven are of such a character as to tend to produce conditions similar to that illustrated in Fig. 2, in which the closed circuit period exceeds the open circuit period, it will be seen that the mechanism will move the arm 21 a greater distance in a clockwise direction for the closed circuit period than in a counterclockwise direction for the open circuit period. In other words, the net result will be that the mean position of the arm 21 will be at some point further in a clockwise direction. As the heat cycles continue, more and more of the resistance in the heater circuit is taken out, permitting a greater amount of current to traverse the heater 14. This tends to reduce the time required to heat the oven on lowered temperature conditions.

With properly designed heaters and rheostats in the circuit, it will be seen that eventually the arm 21 will be moved to a mean position, which will permit the oven to be heated up at substantially the same rate that it is cooled off and produce an operating condition similar to that illustrated in Fig. 1. As pointed out in connection with the discussion of Fig. 1, such an operating condition will produce a mean oven temperature which coincides with the temperature midway between the thermostat actuating points.

If the external temperature about the oven is raised above normal, the reverse condition of operation will tend to be established. In other words, the closed circuit condition will be shorter than the open circuit condition. In a manner similar to that already described, the collective effect will be to move the contact arm 21 in a counterclockwise direction, increasing the amount of resistance in the heater circuit so as to cut down the current traversing the heater circuit and lengthen the period required to raise the temperature of the oven during each cycle. This proceeds until an equilibrium has been established in which the open and closed circuit periods are substantially of the same length, thus re-establishing the conditions of Fig. 1.

From the foregoing description it will be seen that the arrangement described provides means for automatically regulating the amount of current traversing the heater circuit in substantially direct proportion to the variation of the external temperature of the oven from a mean normal temperature. In other words, the arrangement produces the ideal conditions of electric oven operation at all times within predetermined limits of variation of the external temperature conditions. With this apparatus the temperature of an electric oven can be maintained within the closest possible limits. By shortening the heat cycle and employing a thermostat which opens and closes the circuit within very small limits, it is possible to maintain the oven temperature to within a fraction of a degree under very extreme conditions.

It is to be understood that the illustration of the apparatus is diagrammatic and that any type of apparatus fulfilling conditions set forth may be employed.

While this invention has been described in but one form, it will be apparent to those skilled in the art that it is not so limited, but is susceptible to various changes and modifications without departing from the spirit thereof. It is desired, therefore, that only such limitations shall be placed thereon as are imposed by the prior art and as set forth in the appended claims.

What we claim is:

1. In a heating system, the combination of a structure to be heated, means to provide for the flow over a predetermined path of a heat supplying medium to the structure when its temperature tends to drop below a certain point and to withhold the flow of said medium from the structure when the temperature tends to rise above a certain point, and restraining means arranged to introduce restraint in said path for regulating the rate of flow of the medium, means for decreasing at a predetermined rate the restraint introduced in said path by said restraining means during the flow periods of the medium, and means for increasing the restraint introduced by said restraining means at substantially the same rate during withholding periods of the medium, so that, when the periods of flow and withholding of the medium are unequal, accumulated differences in the amount of restraint introduced into said path will tend to regulate the rate of flow of said medium in such a manner as to equalize said periods.

2. An oven temperature regulator comprising in combination an electric heating circuit embodying a heating element and a thermostat for periodically opening and closing said circuit in response to the rise and fall of the temperature in the oven, a rheostat in series with the heater circuit, and means for imparting a continuous adjusting movement to said rheostat in a direction to decrease the amount of resistance in series with the heater circuit while said circuit is closed and in a direction to increase the amount of resistance in series with said heater circuit while said circuit is open, whereby the cumulative adjustment tends to supply the correct amount of heat for causing the open and closed circuit periods to become equalized.

3. In combination with an electrically heated structure, a heater circuit, thermostatic means for opening and closing said heater circuit in response to temperature changes in the structure, a current regulator for said circuit comprising a rheostat embodying a resistance and an arm pivotally mounted on a shaft and disposed to couple more or less of said resistance into the heater circuit as the shaft is rotated in one direction or the other, an electric motor suitably connected to said arm shaft to move the same slowly while the motor is in operation, and means responsive to the open or closed condition of the heater circuit for operating the motor in a direction to move the shaft to couple less resistance into the heater circuit when said circuit is closed and vice versa when said circuit is open.

4. In combination with an electrically heated structure, a heater circuit, thermostatic means for opening and closing said heater circuit in response to temperature conditions in the structure, a current regulator for said circuit comprising a resistance and a member for coupling more or less of the resistance into the circuit and an electric motor suitably coupled to said member to move it slowly while the motor is in operation and means responsive to the heater circuit conditions for operating the motor so that the regulating member is moved in a direction to couple a progressively lesser amount of resistance into the circuit during closed circuit periods and a greater amount of resistance into the circuit during open circuit periods, whereby when the periods are unequal a net change of the amount of resistance in the circuit will be effected in such a direction as to tend to regulate the heat to the required amount to produce a heat cycle of substantially equal open and closed circuit periods.

5. A temperature control system comprising an electric heater, a circuit for said heater, a thermostatically operated circuit closer coupled in said circuit, impedance means in said circuit for varying the current to said heater, actuating means for increasing or decreasing the impedance at a predetermined rate, control means operated in accordance with the open or closed condition of said heater circuit, said control means being arranged to cause said actuating means to decrease said heater circuit impedance during the periods of closed circuit conditions, and to increase said impedance during the periods of open circuit conditions, whereby when said periods are unequal, the cumulative impedance change will tend to regulate the heater current to an amount required to produce equal periods of open and closed circuit conditions.

6. A temperature control system comprising an electric heater, a circuit for said heater, a thermostatically operated circuit closer coupled in said circuit, a rheostat in said circuit for varying the current to said heater by varying the resistance in said heater circuit, a reversible motor for moving said rheostat at a predetermined rate to increase or decrease the resistance in said circuit, a motor reversing relay coupled in said heater circuit and operated in accordance with the open or closed condition of said circuit, said relay causing said motor to move the rheostat in such direction as to decrease the resistance in said heater circuit during the periods of closed circuit conditions and to increase the resistance during the periods of open circuit conditions, whereby when said periods are unequal, the cumulative resistance change will tend to regulate the heater current to an amount suitable to produce equal periods of open and closed circuit conditions.

WILLIAM D. BUCKINGHAM.
JULIAN Z. MILLAR.